(12) United States Patent
Cerciello et al.

(10) Patent No.: US 10,953,426 B2
(45) Date of Patent: Mar. 23, 2021

(54) DEVICE FOR SPREADING AN ADHESIVE ON A FILM AND APPARATUS FOR PRODUCING A MULTI-LAYER FILM PROVIDED WITH SAID SPREADING DEVICE

(71) Applicant: NORDMECCANICA S.P.A., Piacenza (IT)

(72) Inventors: Vincenzo Cerciello, Piacenza (IT); Stefano Farina, Piacenza (IT); Lino Scopesi, Piacenza (IT)

(73) Assignee: NORDMECCANICA S.P.A., Piacenza (IT)

(*) Notice: Subject to any disclaimer, the term of this patent is extended or adjusted under 35 U.S.C. 154(b) by 74 days.

(21) Appl. No.: 16/099,287

(22) PCT Filed: Dec. 5, 2016

(86) PCT No.: PCT/IB2016/057353
§ 371 (c)(1),
(2) Date: Nov. 6, 2018

(87) PCT Pub. No.: WO2017/195011
PCT Pub. Date: Nov. 16, 2017

(65) Prior Publication Data
US 2020/0179973 A1 Jun. 11, 2020

(30) Foreign Application Priority Data
May 10, 2016 (IT) .................. 102016000047976

(51) Int. Cl.
*B05C 1/08* (2006.01)
*B32B 37/00* (2006.01)
(Continued)

(52) U.S. Cl.
CPC .......... *B05C 1/0834* (2013.01); *B05C 1/0882* (2013.01); *B32B 37/0053* (2013.01);
(Continued)

(58) Field of Classification Search
CPC ... B05C 1/0834; B05C 1/0878; B05C 1/0882; B05C 1/0895; B32B 7/12;
(Continued)

(56) References Cited

U.S. PATENT DOCUMENTS

| | | | |
|---|---|---|---|
| 5,605,575 A * | 2/1997 | Anderson | ................ B05C 1/003 118/101 |
| 5,709,148 A * | 1/1998 | Uera | ........................ B41F 31/00 101/365 |
| 2009/0188632 A1* | 7/2009 | Cerciello | ............. B32B 37/0046 156/557 |

FOREIGN PATENT DOCUMENTS

DE   10 2008 012 072    8/2009
EP    0 324 892           7/1989
(Continued)

OTHER PUBLICATIONS

Translation of DE 10 2008 012 072, Published Aug. 13, 2008, Windnnoeller & Holscher KG, (Year: 2008).*
(Continued)

*Primary Examiner* — George R Koch
(74) *Attorney, Agent, or Firm* — Nixon & Vanderhye (57) ABSTRACT

Disclosed is a device for spreading an adhesive on a film, including at least a first metering roller and at least a second metering roller, which rotates in contact with an adhesive, the surface of the first metering roller being spaced from the surface of the second metering roller by a gap so that a portion of the surface of the second metering roller is coated with a uniform layer of adhesive, and a regulating device for moving at least the first metering roller with respect to the second metering roller to vary the width of the gap, wherein
(Continued)

the regulating device is controlled by a control unit, the control unit being configured to control the position of the first metering roller and to regulate the width of the gap as a function of geometric and/or dimensional parameters of the first metering roller.

20 Claims, 6 Drawing Sheets

(51) Int. Cl.
*B32B 37/06* (2006.01)
*B32B 37/10* (2006.01)
*B32B 37/12* (2006.01)
*B65G 43/02* (2006.01)

(52) U.S. Cl.
CPC .............. *B32B 37/06* (2013.01); *B32B 37/10* (2013.01); *B32B 37/1284* (2013.01); *B65G 43/02* (2013.01)

(58) Field of Classification Search
CPC ..... B32B 37/0053; B32B 37/02; B32B 37/06; B32B 37/1284; B32B 2037/1269; B32B 2439/70; B65G 43/02
See application file for complete search history.

(56) References Cited

FOREIGN PATENT DOCUMENTS

| | | |
|---|---|---|
| EP | 2 085 218 | 8/2009 |
| JP | 56-144766 | 11/1981 |
| WO | WO 2015/002749 | 1/2015 |

OTHER PUBLICATIONS

International Search Report, PCTIB2016/057353, dated Mar. 17, 2017.
Written Opinion, PCT/IB2016/057353, dated Mar. 17, 2017.

* cited by examiner

DEVICE FOR SPREADING AN ADHESIVE ON A FILM AND APPARATUS FOR PRODUCING A MULTI-LAYER FILM PROVIDED WITH SAID SPREADING DEVICE

This application is a 371 of PCT/IB2016/057353, filing date Dec. 5, 2016.

The present invention concerns a device for spreading an adhesive on a film and an apparatus for producing a multi-layer film comprising a spreading device of this type.

In various sectors of industry, especially the packaging industry, films consisting of several layers, also of different materials, mutually coupled by means of co-extrusion or gluing, are used.

Among the various types of adhesives available, solventless adhesives are those most widely used in this sector, especially for packaging intended for the food industry.

Methods and machinery for coupling several layers of film with solventless adhesives are known, for example, from the patents EP 0324892 B2 and EP 2085218 B1, by the same applicant.

According to these known methods, to join two layers of film, a solventless two-component adhesive is deposited on one face of one of the two layers and, subsequently, the two layers are brought into contact to create a laminated multi-layer film.

These processes use a solventless two-component adhesive, the two components of which, typically resin and hardener, are mixed before being applied to the layer of film and, more precisely, before being conveyed to the coupling machine.

The mixing of the two components gives rise to a chemical reaction that, according to the initial compounds, is polymerization, cross-linking, or both, which gradually increases the viscosity of the adhesive until it hardens completely. Simultaneously, the adhesive increases its bonding strength that allows the two layers of film to be firmly joined.

Therefore, after mixing, application of the adhesive to the film must take place within a limited time interval in which its viscosity is such as to allow it to be deposited in a uniform layer with a thickness of a few microns.

The time limit within which the mixed adhesive is "spreadable" on the film is called "pot life".

Beyond this time limit, the adhesive, which is no longer re-usable, must be removed quickly and completely from the parts of the machinery with which it is in contact to prevent damaging them.

However, the cleaning operations of these parts are particularly onerous both in terms of cost, due to the need to use chemical products (solvents, etc.), and from the viewpoint of organizing work, due to the urgency with which these operations must be carried out, i.e. before complete hardening of the adhesive.

For these reasons, the composition of solventless adhesives currently used is studied to ensure a compromise between "pot life" that is not too short, for example to allow the production process to be interrupted for several tens of minutes without having to resort to machine downtime and cleaning of the parts in contact with the adhesive, and a hardening time that is not too long.

However, at the end of the coupling process with the adhesives currently used, the multilayer film must be stored to rest for a period variable from several tens of hours (or even for days) to allow completion of the hardening process, before being used for subsequent operations, such as cutting or printing.

However, the recent tendency is to try to reduce the hardening time to a minimum to obtain the end product as quickly as possible in order to optimize the production capacity and flexibility of the systems.

WO 2105/002749 A1 discloses a method and an apparatus for joining two layers of film in which each of the two components of an epoxy resin based two-component adhesive are applied separately to the two layers of film. The two films are brought into contact to form a laminate and the components are mixed between the two layers of film to activate the epoxy. Mixing takes place by means of ultrasonic cavitation, which generates the formation and subsequent implosion of bubbles that by agitation of the components of the adhesive activate the chemical reaction that leads to hardening of the adhesive composition.

However, the apparatus and the method described in WO 2105/002749 A1 have some disadvantages. In fact, the effectiveness of mixing is influenced by the speed with which the layers of film move in the apparatus and, more precisely, by the time range within which the two components of the adhesive, interposed between the two layers of film, are exposed to the ultrasonic waves.

Therefore, with this system, as the process speed increases, a parameter that it is normally desirable to maximize, mixing of the two components decreases. This can cause slowing or incompletion of the hardening process of the adhesive composition.

Moreover, with this system mixing of the two adhesive components and the subsequent reaction is difficult to control, making calibration of the machine complicated.

To overcome the aforesaid problems, the applicant has devised a method in which the two components of a two-component adhesive are applied separately to the two layers of film, which are then brought into contact to form a laminated multi-layer film. According to this method, activation of the reaction of the two components takes place through simple contact of the faces to which the components of the adhesive are applied.

Within the context of the present invention, the term "simple contact" means that the two components are mixed together simply by coming into mutual contact, i.e. without the aid of external means adapted to provide energy, for example in the form of heat, ultrasonic waves, electromagnetic radiation or the like, to cause mixing of the components to take place.

However, as this is only possible as a function of the parameters of thickness and of uniformity of the layer of the component of the adhesive applied to the respective layers of film, these parameters require to be controlled in a particularly precise manner.

In fact, with this method the amount of adhesive or component of the adhesive composition spread on each layer, and therefore the thickness, is around half, or even less, with respect to that of prior art methods which use a pre-mixed adhesive spread on only one of the two layers of film to be joined.

More in detail, this thickness is typically less than 1.5 micron and preferably from 0.3 to 0.8 micron. To ensure complete and uniform reaction of the adhesive composition included between the two layers of film, the variation of the thickness of the layer of each component of the adhesive must not exceed 10% of the nominal value of the thickness, i.e. a few hundredths of micron.

Prior art spreading units, such as those described in EP 0324892 B2, are unable to perform such fine regulation of the thickness of the layer of adhesive capable of satisfying the aforesaid parameters. This depends mainly on the difficulty of limiting the operating tolerances of the parts of the spreading device, and in particular the rollers, without having to resort to alternative and particularly costly production processes.

Moreover, these prior art devices are provided with manual regulation systems, the effectiveness of which depends mainly on the ability of the operator setting the device.

In this context, the aim of the present invention is to provide a device for spreading adhesive onto a film, which overcomes the problems of the prior art described above.

It is therefore an object of the present invention to provide a spreading device that allows precise control of the thickness of the layer of an adhesive applied to layers of a moving film, even when the thickness of said layer is less than 3 or 4 micron.

Another object of the present invention is to provide a spreading device that ensures the repeatability of these parameters of the spreading process.

A further object of the present invention is to provide a spreading device that requires only a few modifications with respect to prior art spreading units and, consequently, is of limited cost.

The object of the present invention is also to provide an apparatus for producing a multi-layer film equipped with the aforesaid spreading device.

In particular, the object of the invention is to provide an apparatus that allows implementation of the aforesaid coupling method devised by the applicant.

These objects and other objects are achieved by a device for spreading an adhesive on a film, which comprises:
- at least a first metering roller; and
- at least a second metering roller, facing the first and that can rotate in contact with an adhesive;
- wherein the surface of the first metering roller is spaced from the surface of the second metering roller by a gap such that, following rotation, a portion of the surface of the second metering roller is coated with a uniform layer of adhesive, the device also comprising a regulating device for moving at least the first metering roller with respect to second metering roller to vary the width of the gap, and consequently the thickness of the layer of adhesive on the surface of the second roller.

In accordance with a preferred aspect of the invention, said regulating device can be controlled by a control unit, which can be configured to control the position of the first metering roller and to regulate the width of the gap as a function of geometric and/or dimensional parameters of said first metering roller.

The device thus obtained allows correction of the position of the first metering roller, with respect to a predetermined nominal position, cancelling or in any case limiting the effects that the geometric and/or dimensional tolerances of the first metering roller would have on the actual value of the aforesaid gap.

According to an aspect of the invention, the control unit can be connected to a device for detecting the angular position of the first metering roller.

As a function of this position, the control unit determines the dimensional and/or geometric parameters of the working area of the first metering roller, calculates a new position of said roller and controls the regulation system to take the roller to the aforesaid position.

According to another aspect of the invention, the first metering roller can be associated with a positioning system that allows the roller to be arranged in a discrete number of defined angular positions. This allows the working area and the related geometric and/or dimensional parameters to be determined and correlated with precision.

According to another aspect of the invention, the control unit can access a database containing the aforesaid geometric and/or dimensional parameters of the first metering roller.

In another aspect of the invention, the regulating device can comprise a pair of eccentric supports, each adapted to support one end of the first metering roller. Said eccentric supports preferably comprise a fixed portion and a moving portion that can rotate with respect to the fixed portion about an axis of rotation Xe. The first metering roller is housed rotatably in the moving portion so that its axis X is eccentric with respect to the axis of rotation of the moving portion.

The regulating device thus configured allows extremely fine control of the movement of the first metering roller, and therefore of the gap, which can be of only one micron. This value, referred to the thickness of the layer of adhesive, which is gradually reduced by the second metering roller up to the spreading roller, allows a variation of the thickness of the layer of adhesive on the film up to a few hundredths of micron.

According to a preferred variant, the moving portion is rotatable with respect to the fixed portion by means of a motor controlled by the control unit. Said moving portion preferably comprises a ring provided, externally, with teeth, meshed on which is a worm screw connected to the aforesaid motor.

In another aspect of the invention, the control unit can be connected to sensors adapted to detect a parameter correlated with the temperature of the surface of one or of both the metering rollers 121, 122.

The aforesaid objects are also achieved by an apparatus for producing a multi-layer film equipped with one or more spreading devices as described above. Advantageously, said apparatus can be configured to implement a method for producing a multi-layer film in which two components of a two-component adhesive are applied separately to two layers of film, which are then brought into contact to form a laminated multi-layer film.

According to a preferred variant, said apparatus comprises:
- a first spreading device for spreading a first component of a two-component adhesive on at least a first face of a first layer of film;
- a second spreading device for spreading a second component of the two-component adhesive on at least a first face of a second layer of film;
- a coupling unit for bringing the aforesaid faces of said first and second layers into mutual contact in a gluing point to create a multi-layer film;
- a winder for winding the coupled multi-layer film on a take-up reel.

Using spreading devices in accordance with the invention, it is possible to apply the component of the adhesive to the layers of film with the required thickness, even less than 0.5 micron, being able to control the variability with the precision of a few hundredths of micron.

In an aspect of the invention, the coupling unit can comprise a calender and a presser roller, defined between which is a gluing point in which the two faces of the films come into contact. To optimize the reaction process of the components of the adhesive, after the gluing point the coupled multi-layer film is wound on the calender on an arc of contact with an angle preferably from 18° to 23°.

Also for this purpose, according to another aspect of the invention, before the gluing point, the first layer of film is wound on the calender on an arc of contact with an angle preferably from 68° to 78°.

Further characteristics and advantages of the present invention will become more apparent from the description of an example of a preferred, but not exclusive, embodiment of a spreading device and of an apparatus for producing a multilayer film, as illustrated in the accompanying drawings, wherein.

Figure 1:
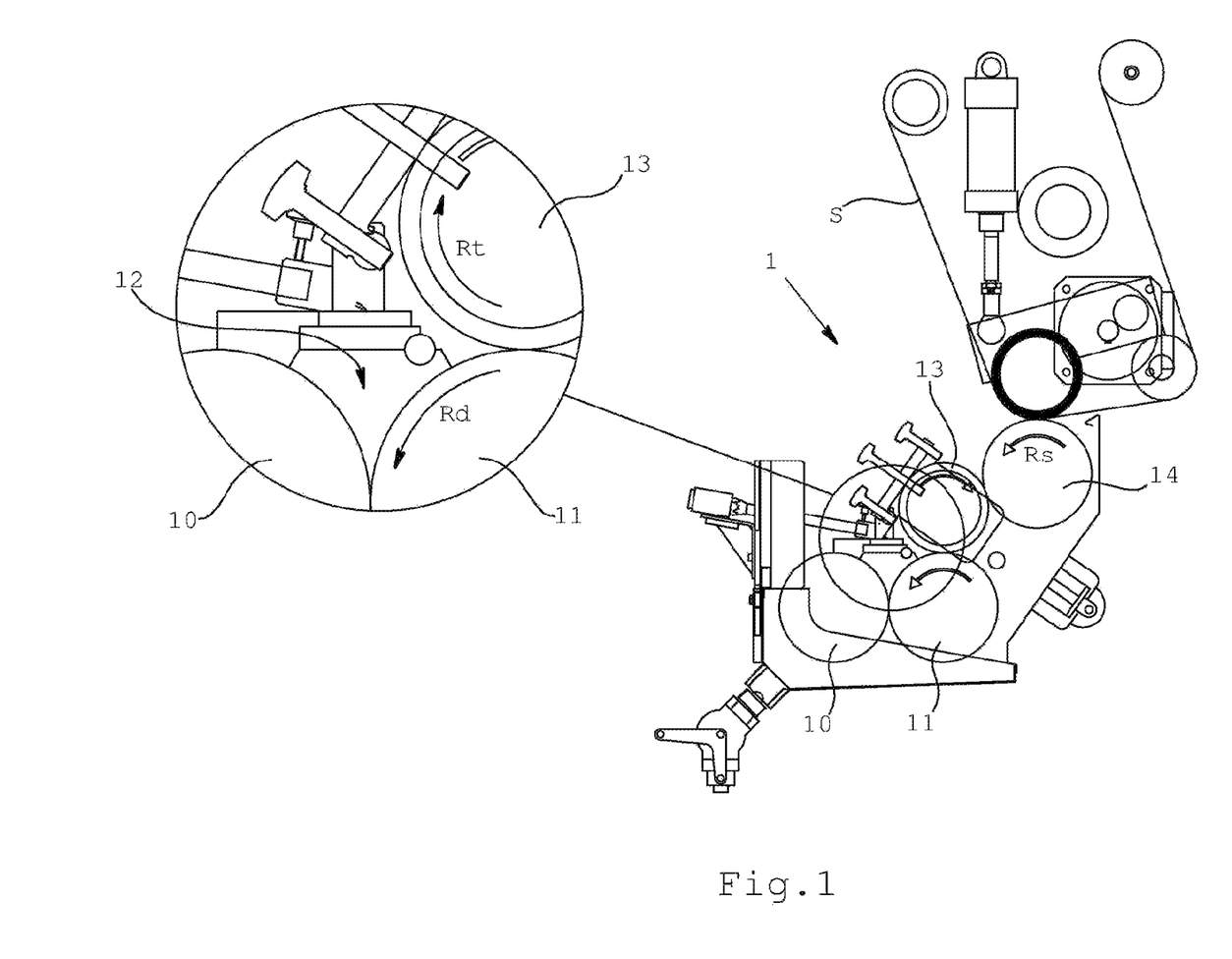
FIG. 1 is a schematic lateral view of a spreading device in accordance with the present invention.

With reference to the accompanying FIG. 1, the number 1 indicates as a whole a device for spreading an adhesive on a moving film.

Within the context of the present invention, adhesive is meant as an adhesive composition with at least two components formulated as a kit, the components of which are prepared separately and kept separated from each other until the moment in which the layers of film to be joined are coupled and in which the components of the kit are in preferably in fluid or paste-like form.

The term film is meant as any structure, typically flexible, with a thickness of less than 1 mm and preferably less than 0.5 mm. Suitable materials are, for example, paper, polymers and metal coated polymers, metal sheets or nonwoven fabric.

The spreading device comprises a first metering roller 10 and a second metering roller 11, arranged parallel and facing each other. The first metering roller 10 is preferably maintained blocked in rotation during operation of the apparatus. The second metering roller 11 is instead rotated with respect to the first in a direction of rotation indicated by the arrow Rd. The outer surface of the metering rollers 10, 11 is preferably smooth and coated, or made of chromed steel.

In the space between the two metering rollers 10, 11, in the upper part there is defined a chamber 12 into which there can be deposited an adhesive in contact with a part of the outer surface of both rollers. To maintain the fluidity of the adhesive at a desired value, the metering rollers are preferably provided with heating means to heat the outer surface.

The surfaces of the two metering rollers 10, 11 are spaced by a gap of a few hundredths of millimetre so that, following rotation of the second metering roller with respect to the first, the adhesive is laminated through the gap and a thin and uniform layer remains adhering to the surface of the second metering roller 11. This layer of adhesive, by means of one or more rollers that rotate in contact with the second metering roller 11, is transferred to a moving film S.

In the variant illustrated, the spreading device comprises a further conveyor roller 13 that rotates in contact with the second metering roller 11 in an opposite direction of rotation Rt.

The conveyor roller 13 is preferably coated with a layer of vulcanized rubber. The task of the conveyor roller 13 is to pick up the layer of adhesive from the second metering roller 11 and transfer it to a spreading roller 14 that rotates in contact therewith in an opposite direction of rotation Rs.

The spreading roller 14 is, in turn, placed in contact with the layer of moving film S, on which the adhesive is spread in a continuous and uniform layer.

Advantageously, the rotation speed of the spreading roller 14 is greater with respect to that of the conveyor roller 13 which, in turn, is greater with respect to that of the second metering roller 11.

This increase in speed allows a gradual decrease in the thickness of the layer of adhesive deposited on the surface of the rollers and, subsequently, on the layer of film.

The gap, i.e. the minimum distance between surfaces of the metering rollers 10, 11, can be regulated by means of a regulation system so as to vary the thickness of the layer of adhesive picked up by the second metering roller 11 and, consequently, the thickness of the layer of adhesive applied to the film S.

FIGS. 2a to 2d illustrate a detail of the spreading device in which the aforesaid regulation system, indicated as a whole with 20, is visible. In accordance with a preferred variant of the invention, said regulation system acts on the first metering roller 10 moving it with respect to the second metering roller 11 whose axis of rotation is fixed.

The first metering roller 10 comprises an operating central portion 10a comprised between two support shafts 10b (FIG. 2d), by means of which the metering roller is supported by the frame of the spreading device (not illustrated in the figure). Each support shaft 10b is coupled with an eccentric support 21 comprising a fixed portion 22, integral with the frame of the device, and moving portion 23, connected to the fixed portion and rotatable with respect to it about an axis of rotation Xe (FIG. 3). Said fixed and moving portions are preferably in the form of concentric rings. More in detail, the moving portion 23, inner ring, is housed in the fixed portion 22, outer ring.

The support shaft 10b is, in turn, housed rotatingly in a seat produced in the moving portion 23 so that its axis of rotation X is decentred with respect to the axis of rotation Xe of the moving portion. FIG. 3 represents, schematically and in section, the fixed portion 22, the moving portion 23 and support shaft 10b. In the figure, the letter E indicates the eccentricity between the axis X of the first metering roller 10 and the axis of rotation Xe of the moving portion 23, which, to make the drawing clearer, is intentionally out of proportion. In actual fact, the value of the eccentricity E is preferably from 0.2 mm to 1 mm.

By observing FIG. 3, the operation of the regulating device 20 can be better understood. When the moving portion 23 is rotated about the axis Xe by an angle α, the axis X of the first metering roller 10 performs a rotation along a circumference with a radius E moving, with respect to an initial position, by a length D. This movement causes the surface of the first metering roller 10 to move toward or away from the surface of the second metering roller 11 and, therefore, increase or decrease of the gap G (not indicated in the figure).

Figure 2A:
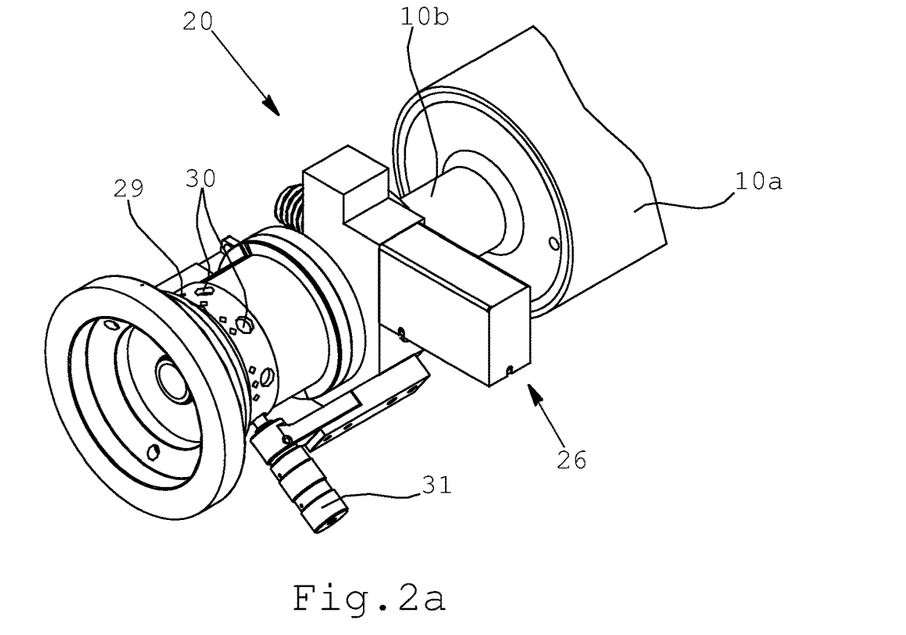
FIGS. 2a and 2b are two perspective views of the regulating device of the position of the metering roller.
Figure 2B:
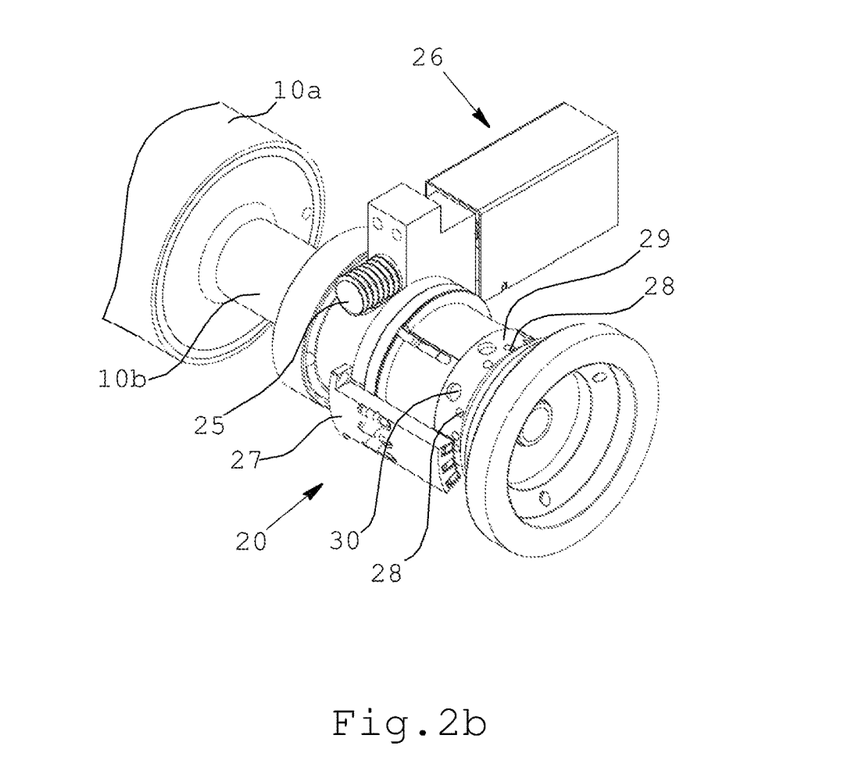
Figure 2C:
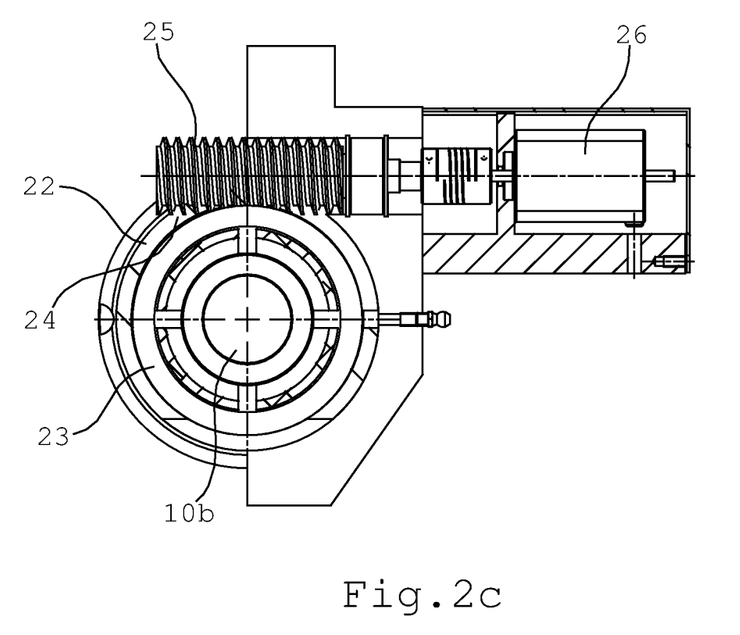
FIG. 2c is a sectional view along a plane perpendicular to the axis of the metering roller.
Figure 2D:
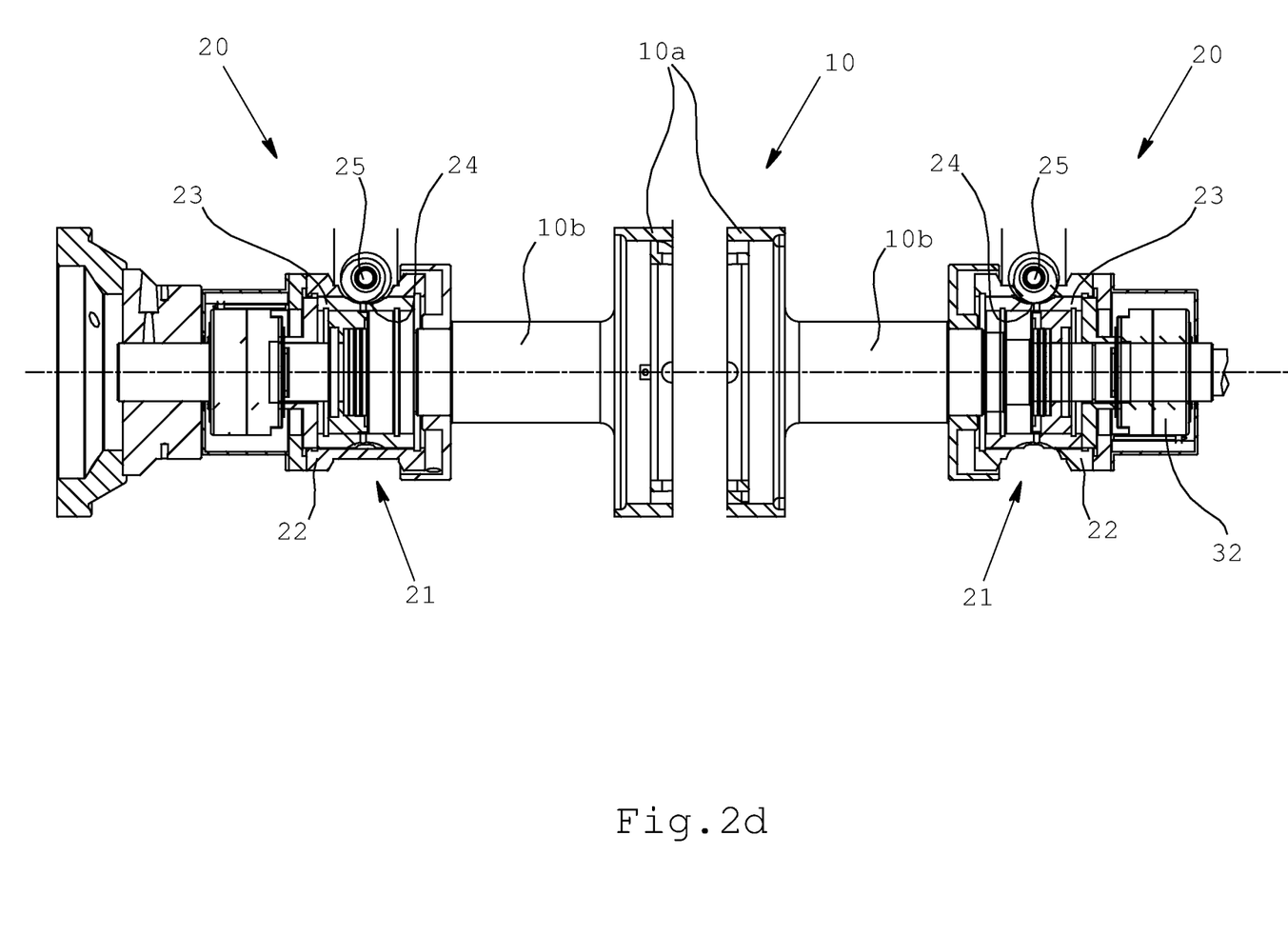
FIG. 2d is a sectional view along a plane passing through the axis of the metering roller.
Figure 3:
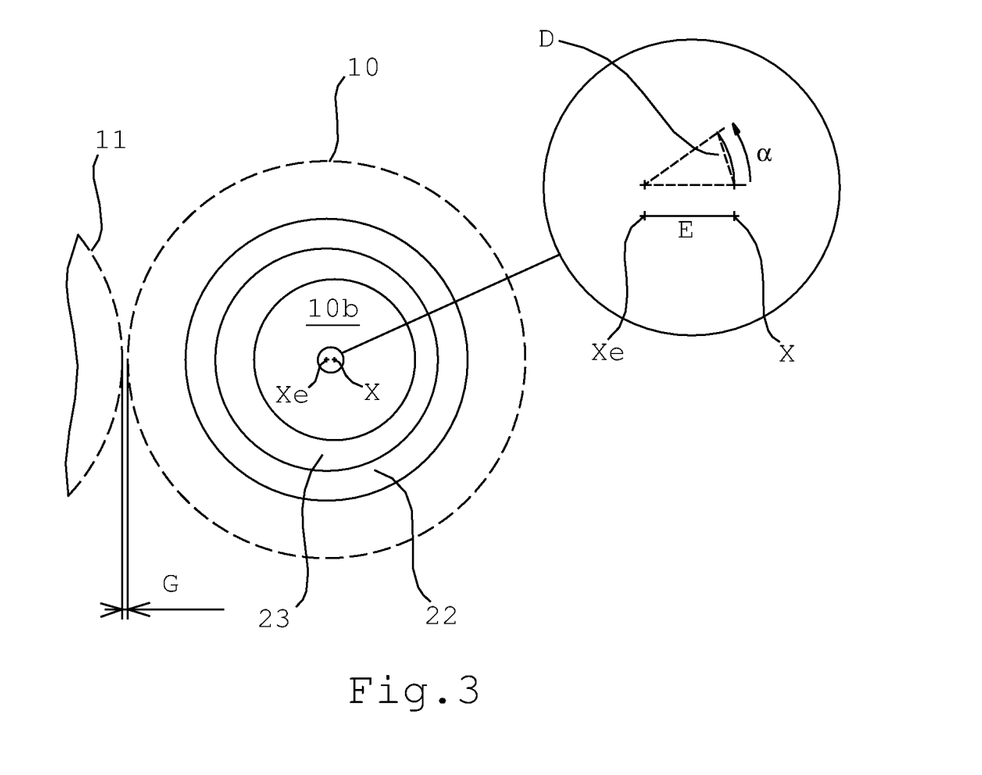
FIG. 3 is a schematized representation of a part of the regulating device of FIG. 2.

On the outer surface of the moving portion 23 there are produced teeth 24, preferably with a helical profile, meshed on which is a worm screw 25 (FIGS. 2c, 2d).

Rotation of the worm screw 25, in one or in the other direction, causes rotation of the moving portion 23 and therefore, as described above, an increase or decrease of the gap G.

The screw 25 is moved by a motor 26, optionally associated with an encoder 32 (FIG. 2d).

A regulation system of this type allows variations of the gap G to be obtained with a precision up to one micron where the extension of the gap is typically from 50 to 80 micron.

According to the invention, the regulation system is controlled by a control unit (not illustrated in the figure) configured to correct the position of the first metering roller 10 with respect to the second metering roller 11, as a function of the geometric and/or dimensional parameters of the surface of the first metering roller. In fact, as said first metering roller 10 is maintained in a fixed angular position during the spreading process, any defects (geometric and/or dimensional tolerances) cannot be averaged as instead occurs for the second metering roller 11.

For this purpose, according to a preferred aspect of the invention, the control unit is connected to a device for detecting the angular position of the first metering roller 10. By means of this device, the control unit detects which part of the surface of the first metering roller 10 is involved in the spreading process, and in particular the zone close to the gap G where the adhesive is laminated on the surface of the second metering roller 11.

In fact, this operating part is not always the same, but, on the contrary, the first metering roller 10 is used in different angular positions, at times even in the same production batch, for example to utilize a new clean zone or, in any case, to utilize its surface in a uniform manner.

Advantageously, the control unit can be connected to, or can contain, a database in which the aforesaid geometric and/or dimensional parameters of the first metering roller 10 such as eccentricity, cylindricity, rectilinearity, etc., are stored.

These parameters can be detected in advance by means of measurement instruments and stored in the aforesaid database.

As a function of the aforesaid parameters, the control unit can control, in a coordinated manner, operation of the motors 26 of the two eccentric supports 21 to position the first metering roller 10 so that the value of the gap G corresponds as closely as possible to the nominal process value constant along the length of the operating part of the metering rollers.

In this way, the regulating device 20 is able to compensate the operating tolerances of the metering rollers, maintaining constant and correct the amount and hence the thickness of the adhesive picked up by the second metering roller.

In a preferred variant, said system for detecting the angular position of the first metering roller comprises one or more sensors 27 (FIG. 2b), integral with the frame of the device, adapted to detect references 28 produced on the first metering roller 10 or on a part integral therewith.

In the variant illustrated, the sensor 27 comprises an optical sensor configured to detect the position of a plurality of holes 28 produced on a hub 29 integral with the first metering roller 10. Alternatively, the sensor 27 can comprise an inductive, capacitive or magnetic sensor, or other position sensors with or without contact.

As mentioned above, the first metering roller 10 can be arranged in different angular positions, which are then maintained while the spreading device is operating. According to a preferred variant, these positions are defined by a plurality of seats 30 (FIG. 2d) produced on the hub 29. A positioning mechanism 31 (FIG. 2c) can engage said seats 30 to maintain, during the process, a given selected angular position.

According to a preferred aspect of the invention, the control unit can be connected to sensors adapted to detect a parameter correlated with the temperature of the surface of one or of both the metering rollers 10, 11.

This parameter can comprise, for example, the temperature of a fluid by means of which the surface of the metering rollers is heated.

The control unit, processing the aforesaid temperature values, is able to calculate the thermal expansions of the rollers and, also as a function of the viscosity/fluidity of the adhesive used, can correct the position of the metering rollers to restore the ideal value of the gap G.

In order to regulate the thickness of the layer of adhesive deposited on the film S, the control unit can be configured to control the motor means that rotate the second metering roller 11 and the conveyor roller 13 and, in particular, to continuously regulate the rotation speed as a function of the translation speed of the film S and optionally of the temperature parameter of the metering rollers.

Figure 4:
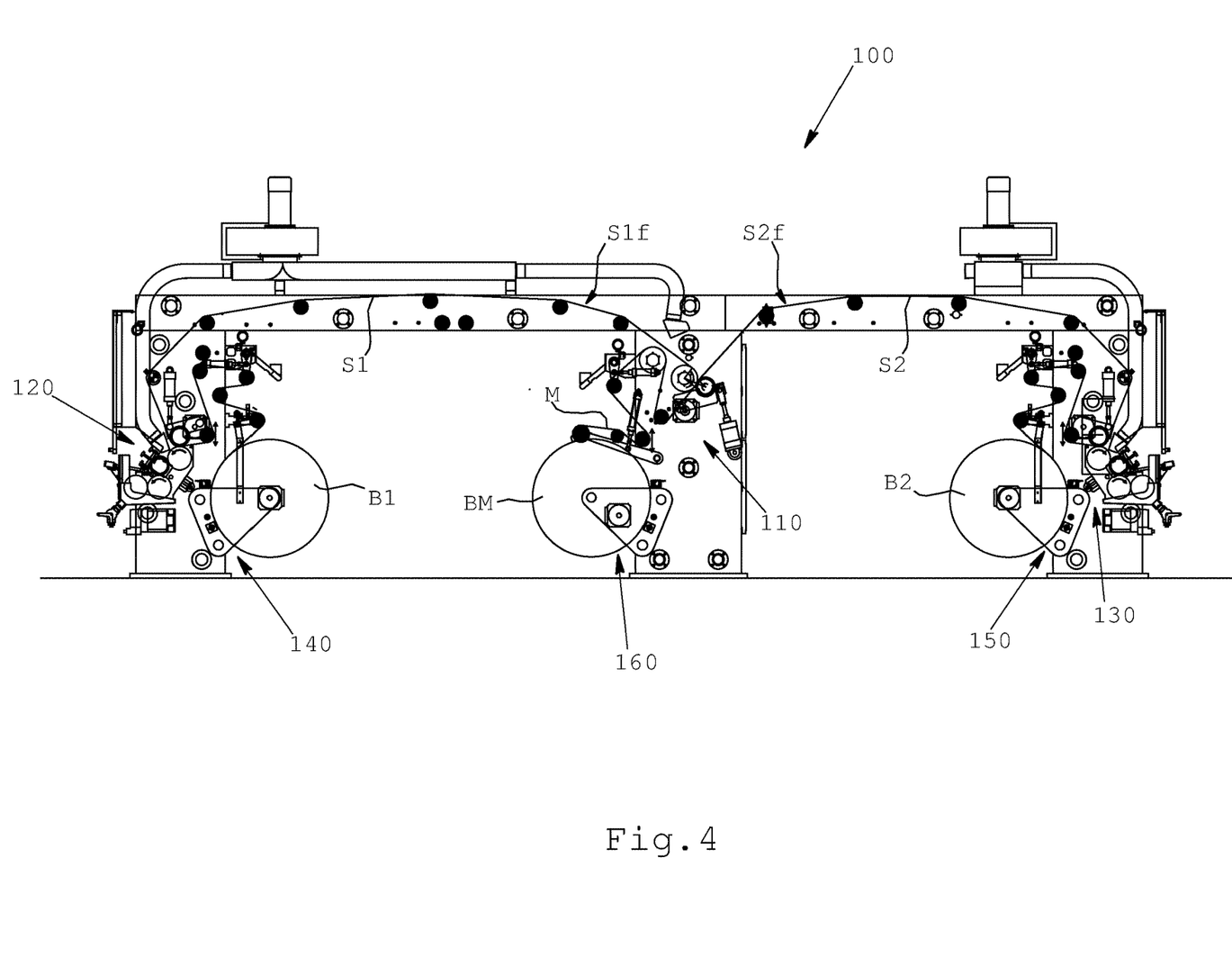
FIG. 4 is a schematic lateral view of an apparatus for producing a multi-layer film equipped with the spreading unit of FIG. 1.

With reference to FIG. 4, the number 100 indicates as a whole an apparatus for producing a laminated multilayer film obtained by joining two layers of film.

The apparatus 100 comprises at least a coupling unit 110, a first spreading device 120 and a second spreading device 130 such as the one described above.

According to a preferred embodiment, said first and said second spreading unit 120, 130 are configured to each spread a component of a two-component adhesive respectively on a first layer of film S1 and on a second layer of film S2.

The two layers of film S1 and S2, are subsequently guided by a plurality of rollers toward the coupling unit in which they are made to adhere to each other to create a coupled multilayer film M.

The first and the second layer of film S1, S2 are unwound from two reels B1, B2 supported and rotated by a first unwinder 140 and by a second unwinder 150 that respectively serve the first spreading device 120 and the second spreading device 130.

The multilayer film M is instead wound on a reel BM by a winder 160.

Figure 5:
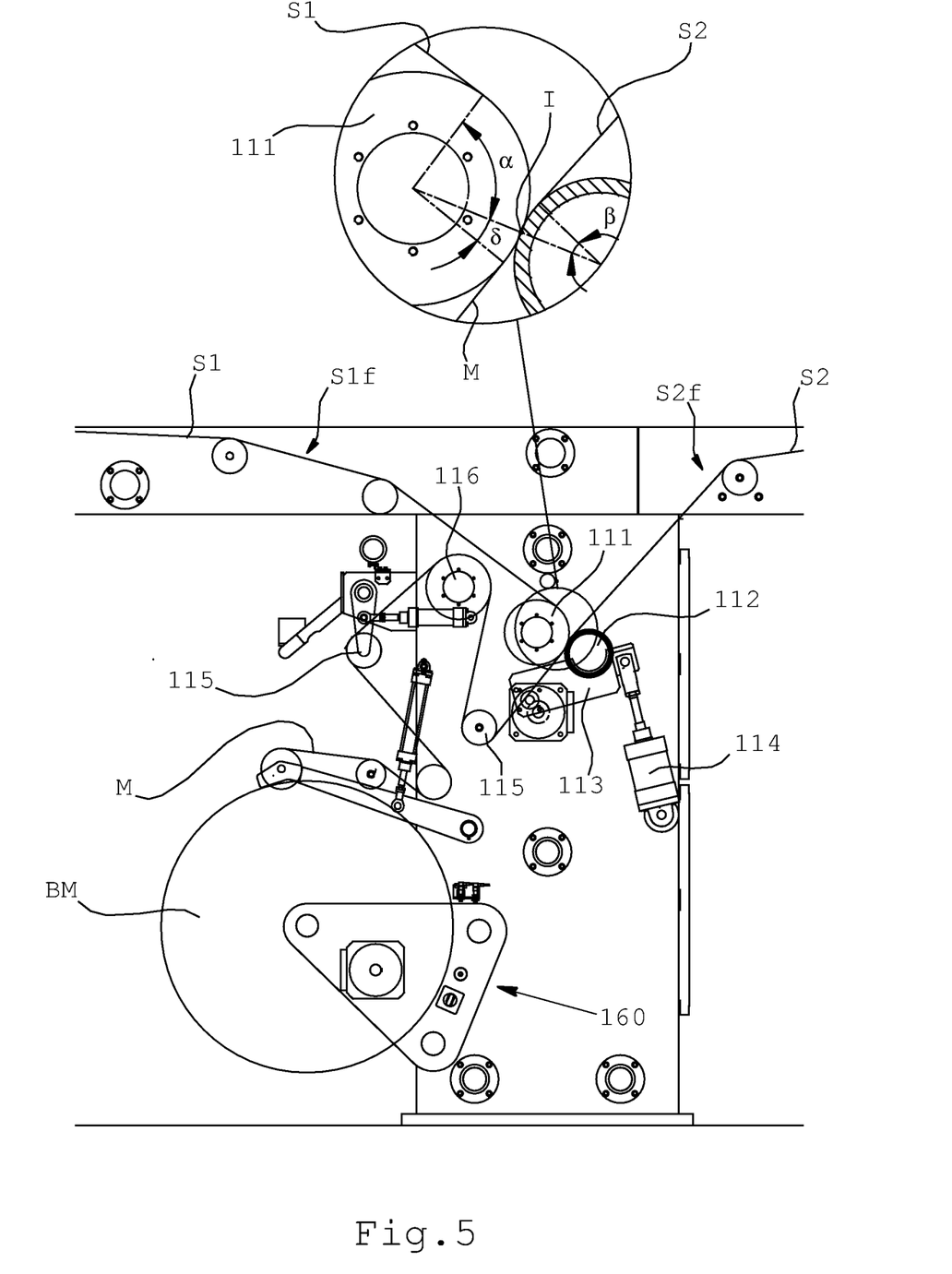
FIG. 5 is a schematic lateral view of the coupling unit of the apparatus of FIG. 4.

FIG. 5 represents the coupling unit 110 of the apparatus. In the coupling unit 110, the first layer of film S1, on the face S1f of which a first component of the adhesive is spread, and the second layer of film S2, on the face S2f of which a second component of the adhesive is spread, converge.

According to a preferred variant, the coupling unit 110 comprises a heated calender 111 and a presser roller 112, preferably rubber coated, that rotates in contact with the calender 111.

The presser roller 112 is mounted on a moving support 113 that, by means of actuators 114, can be rotated around a pivot point Ps to move the presser roller 112 away from the calender 111 or to regulate the contact pressure.

Between the calender 111 and the presser roller 112 there is defined a gluing point I, in which the two faces S1f and S2f come into contact to start the chemical reaction of the two components of the adhesive.

The contact pressure exerted by the presser roller is sufficient to complete mixing of the two components A and B of the adhesive so that, after the gluing point, the two layers of film S1, S2 are joined and in a multilayer film M.

According to a preferred variant, the first layer of film S1 is partially wound around the surface of the calender 111 before the contact point I, while the second layer of film S2 is partially wound on the outer surface of the presser roller 112.

According to a preferred variant, the calender 111 is heatable with the aid of a fluid that circulates under the outer surface, for example in a network of coiled pipes.

The heat released from the calender 111 can be transferred to the first component of the adhesive on the first layer of film S1 to improve the efficiency of the hardening process.

For this purpose, the first layer of film S1 is conveyed toward the gluing point I so that the winding angle α on the calender 111 is preferably from 68° to 78° and more preferably from 71° to 75°. An ideal angle is of around 73°.

The second layer of film S2 is instead conveyed toward the gluing point I so that the winding angle θ on the presser roller is preferably from 18° to 26° and more preferably from 20° to 24°. An ideal angle is of around 22°.

Again to improve the hardening process of the adhesive, after the gluing point I, the coupled multilayer film M is preferably maintained in contact with the calender 111 for an arc of contact of δ from 18° to 23°.

A plurality of guide rollers 115 convey the coupled film M from the gluing point I toward the winder 160 in which it is wound onto a take-up reel BM.

Preferably, the coupling unit is provided with a further cooled calender 116, placed between the gluing point I and the winder 160.

As a function of the material of the layers of film S1, S1, the multilayer film M can be cooled, winding it partially on said calender 116 before it is wound.

The invention has been described purely for illustrative and non-limiting purposes, according to some preferred embodiments. Those skilled in the art may find numerous other embodiments and variants, all falling within the scope of protection of the claims below.

The invention claimed is:

1. A spreading device for spreading an adhesive on a film, the spreading device comprising:
   a first metering roller (10), the first metering roller (10) being blockable in rotation and maintained in a fixed angular position during a spreading process during operation of the spreading device;
   a second metering roller (11), the second metering roller (11) facing the first metering roller (10), the second metering roller (11) being rotatable in contact with an adhesive;
   wherein a surface of the first metering roller (10) is spaced from a surface of the second metering roller (11) by a gap (G) such that, following rotation, a portion of the surface of the second metering roller (11) is coated with a uniform layer of adhesive; and
   a regulating device (20) for moving at least the first metering roller (10) with respect to the second metering roller (11) to vary a width of the gap (G), and consequently a thickness of the layer of adhesive on the surface of the second metering roller,
   wherein said regulating device (20) is controlled by a control unit, said control unit being configured to control the position of the first metering roller (10) and to regulate the width of the gap (G) as a function of geometric and/or dimensional parameters of the surface of said first metering roller (10).

2. The spreading device according to claim 1, wherein the control unit is connected to a device for detecting an angular position of the first metering roller (10), the control unit being configured to detect which part of the surface of the first metering roller (10) is involved in the spreading process, namely a zone adjacent to the gap (G) where the adhesive is laminated on the surface of the second metering roller (11).

3. The spreading device according to claim 2, wherein the first metering roller (10) is associated with a positioning system that allows said first metering roller to be arranged in a discrete number of defined angular positions.

4. The spreading device according to claim 3, wherein the control unit can access a database containing geometric and/or dimensional parameters of the first metering roller (10).

5. The spreading device according to claim 3, wherein the regulating device (20) comprises a pair of eccentric supports (21), each adapted to support an end of the first metering roller, said eccentric supports comprising a fixed portion (22) and a moving portion (23), rotatable with respect to the fixed portion about a rotation axis (Xe), the first metering roller (10) being housed rotatably in the moving portion so that an axis (X) of said first metering roller (10) is eccentric with respect to the rotation axis (Xe) of the moving portion (23).

6. The spreading device according to claim 2, wherein the control unit can access a database containing geometric and/or dimensional parameters of the first metering roller (10).

7. The spreading device according to claim 2, wherein the regulating device (20) comprises a pair of eccentric supports (21), each adapted to support an end of the first metering roller, said eccentric supports comprising a fixed portion (22) and a moving portion (23), rotatable with respect to the fixed portion about a rotation axis (Xe), the first metering roller (10) being housed rotatably in the moving portion so that an axis (X) of said first metering roller (10) is eccentric with respect to the rotation axis (Xe) of the moving portion (23).

8. The spreading device according to claim 2, wherein the control unit is connected to sensors (27) adapted to detect a parameter correlated to a temperature of the surface of one or of both the metering rollers (10, 11).

9. The spreading device according to claim 1, wherein the control unit can access a database containing geometric and/or dimensional parameters of the first metering roller (10).

10. The spreading device vice according to claim 9, wherein the regulating device (20) comprises a pair of eccentric supports (21), each adapted to support an end of the first metering roller, said eccentric supports comprising a fixed portion (22) and a moving portion (23), rotatable with respect to the fixed portion about a rotation axis (Xe), the first metering roller (10) being housed rotatably in the moving portion so that an axis (X) of said first metering roller (10) is eccentric with respect to the rotation axis (Xe) of the moving portion (23).

11. The spreading device according to claim 1, wherein the regulating device (20) comprises a pair of eccentric supports (21), each adapted to support an end of the first metering roller, said eccentric supports comprising a fixed portion (22) and a moving portion (23), rotatable with respect to the fixed portion about a rotation axis (Xe), the first metering roller (10) being housed rotatably in the moving portion so that an axis (X) of said first metering roller (10) is eccentric with respect to the rotation axis (Xe) of the moving portion (23).

12. The spreading device according to claim 11, wherein the moving portion (23) is rotated with respect to the fixed portion by means of a motor (26) controlled by the control unit.

13. The spreading device according to claim 12, wherein the moving portion (23) comprises a ring provided, externally, with teeth (24), meshed on which is a worm screw (25) connected to said motor (26).

14. The spreading device according to claim 1, wherein the control unit is connected to sensors (27) adapted to detect a parameter correlated to a temperature of the surface of one or of both the first and second metering rollers (10, 11).

15. An apparatus for producing a multi-layer film equipped with at least one of said spreading device according to claim 1.

16. The apparatus according to claim 15, comprising:
- a first of said spreading device (120) for spreading a first component of a two-component adhesive on at least a first face (S1f) of a first layer of film (S1);
- a second of said spreading device (130) for spreading a second component of the two-component adhesive on at least a first face (S2f) of a second layer of film (S2);
- a coupling unit (110) for bringing the aforesaid faces of said first and second layers into mutual contact in a gluing point (I) to create a multi-layer film (M);
- a winder (160) for winding the coupled multi-layer film on a take-up reel (BM).

17. The apparatus according to claim 16, wherein the coupling unit (110) comprises a heated calender (111) and a presser roller (112), defined between which is the gluing point (I) in which the two faces of the first layer of film (S1) and the second layer of film (S2) come into contact, the unit being configured so that after the gluing point the multi-layer film (M) is wound on the calender (111) on an arc of contact with an angle (δ) from 18° to 23°.

18. The apparatus according to claim 17, wherein before the gluing point (I), the first layer of film (Si) is wound on the calender (111) on an arc of contact with an angle (a) from 68° to 78°.

19. The spreading device according to claim 1, wherein the first metering roller (10) is blocked in rotation during the spreading process during the operation of the spreading device and the second metering roller (11) is rotated with respect to the first metering roller (10) during the spreading process.

20. The spreading device according to claim 1, wherein the first metering roller (10) is blocked in rotation at a fixed angular position during the spreading process during the operation of the spreading device and the second metering roller (11) is rotated with respect to the first metering roller (10) during the spreading process.

* * * * *